P. O. SOPER.
Parallel Rulers.
No. 151,928.                        Patented June 9, 1874.
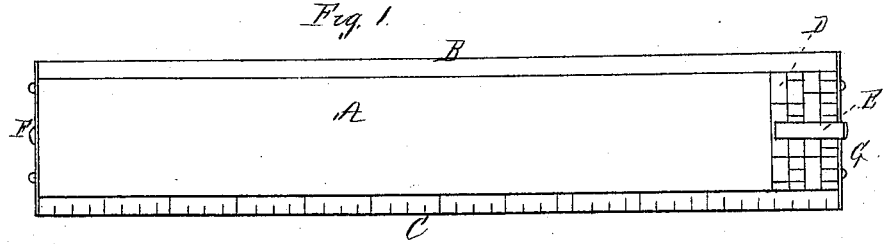
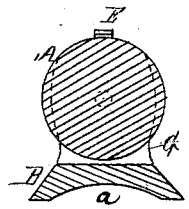
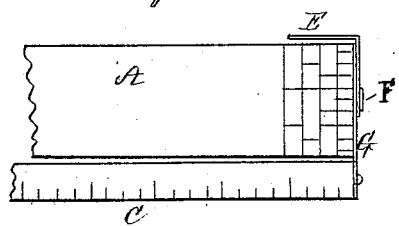
Witnesses,
Sam'l C. Oliver
W. Porter
Inventor,
Philo O. Soper,
By C. A. Shaw,
Att'y

UNITED STATES PATENT OFFICE

PHILO O. SOPER, OF BOSTON, MASSACHUSETTS.

IMPROVEMENT IN PARALLEL RULERS.

Specification forming part of Letters Patent No. 151,928, dated June 9, 1874; application filed December 10, 1873.

*To all whom it may concern:*

Be it known that I, PHILO O. SOPER, of Boston, in the county of Suffolk, State of Massachusetts, have invented a certain new and useful Improvement in Desk-Rulers, of which the following is a description sufficiently full, clear, and exact to enable any person skilled in the art or science to which my invention appertains to make and use the same, reference being had to the accompanying drawing, forming a part of this specification, in which—

Figure 1 is a plan or top view of my improved ruler. Fig. 2 is a transverse section of the same. Fig. 3 is a sectional view, showing the index mechanism.

Like letters refer to like parts in the different figures of the drawing.

My improvement relates to that class of rulers known as round or rolling rulers; and consists in an auxiliary ruler and an index mechanism combined with the ordinary round ruler, as hereinafter more fully set forth, the object being to furnish an article of stationery of this nature more serviceable for general desk and office purposes than has heretofore been provided.

In Fig. 1, A is a round ruler; B, an auxiliary or flat ruler, and E a movable index-finger. The ruler A is provided with journals F, and is mounted in the supports G, which supports are firmly attached to the respective ends of the ruler B. The index-finger E is disposed on one of the journals of the ruler, in such a manner as to be easily moved around such journal as its center of motion, and to remain stationary in any desired position. The end of the ruler A nearest the index-finger E is provided with a ferrule, D, which ferrule is divided into a scale of inches and fractional parts thereof, as shown. The auxiliary or flat ruler B has its base slightly concaved, as at *a*, Fig. 2, and its edges scarfed or chamfered, one edge of the same, C, being also provided with a measure or scale divided into inches and parts of inches after the style of ordinary measuring-rules, although this last may be dispensed with.

From the foregoing the nature and manner of using my improvement will be readily understood by all conversant with such matters.

If it is desired to use the round part of the ruler for marking off or spacing the paper, all that is necessary is to place the ruler on its side, the auxiliary ruler B being nearest the person using it, with one of its edges resting on the paper or desk, and then turn the index-finger until it is at the apex of the index-plate. In this position the ruler may be moved along over the article to be ruled any desired distance at a time, the index mechanism indicating accurately the spaces between the lines.

In the use of all round rulers heretofore constructed, of which I have any knowledge, on account of the small bearing-surface of the same upon the paper, great difficulty has been experienced in keeping them in any desired position long enough to mark a perfectly straight line, and also in determining how far to roll or move them to space the lines evenly. This difficulty is entirely obviated by my improvement, as will be readily seen and understood.

The ruler being on its side, as described, or in such a position that both the round and auxiliary rulers are in contact with the paper to be ruled, if, then, the fingers are pressed firmly upon both rulers at the same time the auxiliary ruler will serve to lock or fasten the round ruler, and prevent it from rolling or sliding by reason of the large amount of bearing-surface which will be in contact with the paper, while the index, as the ferrule passes under the finger, will show the proper points of rest in order to space the lines evenly.

Other methods of using both the round and auxiliary ruler will readily suggest themselves without a detailed explanation.

I am aware that a scale or measure of inches and parts of inches has been combined with a ruler substantially the same as in the auxiliary rule described; also, that an index mechanism substantially the same as described in use in other combinations, and for other purposes; also, that a round ruler is old and in common use. I therefore do not claim any of these when in and of themselves considered. I am also aware that Letters Patent of the United States were granted to one Katen, April 10, 1866, for an improvement in rulers, in which a combined flat and cylindrical ruler is described; but the ruler of said Katen is not provided with index mechanism, and is otherwise different from my invention. I therefore do not herein claim anything shown or described in said patent when in and of itself considered. I am also aware that in English Letters Patent, No. 985, for 1771, a combined round and flat or auxiliary ruler is described, the flat ruler being provided with a scale of inches for measuring purposes, and with other devices; but said last-named ruler is essentially different from my invention, the cylindrical ruler not being mounted in supports, and elevated above the plane of the flat ruler, but is set in a slot in the flat ruler, parallel to and at an equal distance from its graduated edges, so that when the ruler is turned upon its side there is not the requisite amount of bearing-surface upon the paper to keep it in proper position while being used, as in mine. I therefore do not herein claim anything shown or described in said English patent when in and out of itself considered; but What I do claim is—

The combination of the auxiliary ruler B, provided with the scale C, the round ruler A, provided with the scale D, and the index-finger E, the round ruler being mounted in the supports G, substantially as and for the purpose specified.

PHILO O. SOPER.

Witnesses:
 C. A. SHAW,
 H. E. METCALF.